United States Patent
Lanham

(10) Patent No.: US 10,627,268 B2
(45) Date of Patent: Apr. 21, 2020

(54) DIAPHRAGM DISPLACEMENT FLOWMETER

(71) Applicant: Micro Motion, Inc., Boulder, CO (US)

(72) Inventor: Gregory Treat Lanham, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 187 days.

(21) Appl. No.: 15/764,713

(22) PCT Filed: Oct. 14, 2015

(86) PCT No.: PCT/US2015/055463
§ 371 (c)(1),
(2) Date: Mar. 29, 2018

(87) PCT Pub. No.: WO2017/065760
PCT Pub. Date: Apr. 20, 2017

(65) Prior Publication Data
US 2018/0306614 A1    Oct. 25, 2018

(51) Int. Cl.
*G01F 1/28* (2006.01)
*G01F 1/24* (2006.01)
*G01F 1/22* (2006.01)

(52) U.S. Cl.
CPC .................. *G01F 1/28* (2013.01); *G01F 1/22* (2013.01); *G01F 1/24* (2013.01)

(58) Field of Classification Search
CPC ... G01F 1/206; G01F 1/22; G01F 1/24; G01F 1/28; G01F 3/20; G01F 11/08
See application file for complete search history.

(56) References Cited

U.S. PATENT DOCUMENTS

| | | | |
|---|---|---|---|
| 3,971,253 A | 7/1976 | Hini et al. | |
| 4,315,523 A | 2/1982 | Mahawili et al. | |
| 4,775,470 A * | 10/1988 | Zook | A61M 1/16 210/321.71 |
| 5,311,447 A * | 5/1994 | Bonne | G01N 33/225 374/44 |
| 7,963,578 B2 * | 6/2011 | Wells | B66C 1/0212 294/2 |
| 2010/0145635 A1 * | 6/2010 | Pauncz | G01F 1/28 702/45 |

FOREIGN PATENT DOCUMENTS

| | | |
|---|---|---|
| GB | 2144227 A | 2/1985 |
| JP | 58110819 U1 | 7/1983 |
| JP | 2007017367 A | 1/2007 |
| JP | 2013117452 A | 6/2013 |
| WO | 2009072117 A1 | 6/2009 |

OTHER PUBLICATIONS

Iron(III) oxide, Wikipedia, as downloaded by the Internet Archive Wayback Machine on Apr. 8, 2014.*

* cited by examiner

*Primary Examiner* — Justin N Olamit
(74) *Attorney, Agent, or Firm* — The Ollila Law Group LLC

(57) ABSTRACT

A flowmeter (5) is provided having a housing (28) configured to accept a flow of a process material. A diaphragm (18) is disposed in the housing (28), and is deformable by the flow of the process material. A sensor (48) is configured to detect a deformation in the diaphragm (18), and the flowmeter (5) is configured to measure the flow of the process material.

30 Claims, 5 Drawing Sheets

DIAPHRAGM DISPLACEMENT FLOWMETER

FIELD OF THE INVENTION

The embodiments described below relate to the field of fluid flow, and more particularly, to an improved diaphragm displacement flowmeter and related method.

BACKGROUND

Flowmeters and flow sensors are utilized in a number of applications, and have been adopted by the medical industry, chemical industry, automotive industry, and the food and beverage industry to name a few. It is often desirable to have an extremely low cost flowmeter solution, and in some environments a disposable flowmeter may be necessary. For example, in medical settings flowmeters may be contaminated with biohazardous material, which necessitates either autoclaving or disposal after use, both of which may prove costly.

Current technologies that may be considered low cost flow meters include peristaltic pump flowmeters, turbine meters, and differential pressure flowmeters. Even though these meters are considered low cost, they are still relatively expensive. Other than the tubing for the peristaltic pump, these meters would not generally be considered disposable.

It is well known that flow rates may be obtained from a peristaltic pump. The flow through a peristaltic pump may be calculated as a proportion of the rate of pump revolution. The flow rate may be calculated by simply multiplying the revolution rate by a calibration factor. Since tube diameters may not be consistent, elasticity of tubes may vary, and pressures both upstream and downstream of the pump may vary, calculated flow rates tend to be inaccurate. Additionally, by changing out tubes, recalibration may be necessary, which adds to the cost of operation.

Differential pressure flowmeters utilize a region of constriction in a conduit that creates a pressure drop across the constriction. As flow increases through the flowmeter, the pressure drop increases and is more easily measureable. Bernoulli's equation, as applied to such a flowmeter, states that the pressure drop across the constriction is proportional to the square of the rate of flow. By measuring the pressure before and after the constriction, the pressure drop may be measured and correlated with a flow rate. Differential pressure sensors, however typically exhibit low accuracy at low differential pressures/low flow rates. Additionally, accuracy may decline with wear and buildup. Furthermore, these flowmeters are not generally considered disposable due to their cost.

Turbine flowmeters are also well known in the art, and are used in a variety of applications. For example, a turbine is placed in a cylindrical bore of a flowmeter body, and fluid passes through the bore, which causes the turbine to rotate at a rate that is substantially proportional to the rate of fluid flow. However, at low flow rates, the relationship between turbine speed and flow tends to be nonlinear, so flowmeter accuracy suffers. For example, if a magnetic pick-up coil is used to detect rotation of the turbine, changes in the reluctance large enough to induce a detectable current change are largely absent at low speed. Therefore, a magnetic pick-up coil turbine flowmeter is a poor choice for low-flow systems.

In medical industries, for example, there is a need for a flowmeter that can be used in any number of medical devices, wherein bodily fluids are passed therethrough. Once the medical process is complete, the flow meter would need to be autoclaved or disposed of. Currently peristaltic pumps are the method of choice, but these devices are relatively expensive, not particularly reliable, and prone to inaccuracy, as noted above.

The embodiments described below provide an accurate, inexpensive, and disposable flow meter. It is an object to provide an embodiment for the measurement of fluid flow that is accurate, yet inexpensive. It is an object to provide an embodiment for the measurement of fluid flow that is disposable. It is an object to provide an embodiment for the measurement of fluid momentum utilizing diaphragm displacement. These and other objects are provided herein, and an advance in the art is achieved.

SUMMARY OF THE INVENTION

A flowmeter is provided according to an embodiment. The flowmeter comprises a housing configured to accept a flow of a process material. A diaphragm is disposed in the housing, wherein the diaphragm is deformable by the flow of the process material. A sensor is configured to detect a deformation in the diaphragm, and the flowmeter is configured to measure the flow of the process material.

A method of measuring a flow of a process material through a flowmeter is provided according to an embodiment. The method comprises providing a housing configured to accept a flow of a process material, having a diaphragm disposed therein, and providing a sensor configured to detect a deformation in the diaphragm. The method also comprises flowing a process material through the housing, deforming the diaphragm with the force of flow of the process material, and measuring the flow of the process material.

Aspects

According to an aspect, a flowmeter comprises a housing configured to accept a flow of a process material, and a diaphragm disposed in the housing, wherein the diaphragm is deformable by the flow of the process material. A sensor is configured to detect a deformation in the diaphragm, and the flowmeter is configured to measure the flow of the process material.

Preferably, the diaphragm comprises a sensing ring.
Preferably, the sensor is configured to detect a position of the sensing ring.
Preferably, the sensor is a magnetic sensor.
Preferably, the sensor is a Hall effect sensor.
Preferably, the sensor is an infrared sensor.
Preferably, the sensing ring comprises a ferrous portion.
Preferably, the sensing ring comprises a magnetic portion.
Preferably, the flowmeter comprises a magnet disposed proximate the sensor.
Preferably, the flowmeter comprises a base configured to receive the flowmeter.
Preferably, the sensor is disposed in the base.
Preferably, the diaphragm comprises an aperture configured to allow process material to flow therethrough.
Preferably, the flowmeter comprises a temperature sensor configured to detect a temperature of the process material.
Preferably, the temperature sensor is disposed in the base.
Preferably, the diaphragm comprises a data transmitter with the flowmeter comprising associated data, and a data receiver with the base, wherein the data associated with the data transmitter is communicable to the data receiver.
Preferably, the deformation in the diaphragm is proportional to the flow of the process material.

According to an aspect, a method of measuring a flow of a process material through a flowmeter comprises: providing a housing configured to accept a flow of a process material, having a diaphragm disposed therein; providing a sensor configured to detect a deformation in the diaphragm; flowing a process material through the housing; deforming the diaphragm with the force of flow of the process material; and measuring the flow of the process material.

Preferably, the deformation of the diaphragm is proportional to the flow of the process material.

Preferably, the method comprises the step of providing a sensing ring on the diaphragm.

Preferably, the sensor is configured to detect a position of the sensing ring.

Preferably, the sensor is a magnetic sensor.

Preferably, the sensor is a Hall effect sensor.

Preferably, the sensor is an infrared sensor.

Preferably, the sensing ring comprises a ferrous portion.

Preferably, the sensing ring comprises a magnetic portion.

Preferably, the method comprises the step of placing a magnet proximate the sensor.

Preferably, the method comprises the step of providing a base configured to receive the flowmeter.

Preferably, the sensor is disposed in the base.

Preferably, the method comprises the step of forming an aperture in the diaphragm, wherein the aperture is configured to allow process material to flow therethrough.

Preferably, the method comprises the step of providing a temperature sensor configured to detect a temperature of the process material.

Preferably, the temperature sensor is disposed in the base.

Preferably, the method comprises the steps of providing a data transmitter with the flowmeter; transmitting data with the data transmitter; providing a data receiver with the base; and receiving the data with the data receiver.

BRIEF DESCRIPTION OF THE DRAWINGS

The same reference number represents the same element on all drawings. The drawings are not necessarily to scale.

DETAILED DESCRIPTION OF THE INVENTION

FIGS. 1-6 and the following description depict specific examples to teach those skilled in the art how to make and use the best mode of embodiments of a diaphragm displacement flowmeter and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
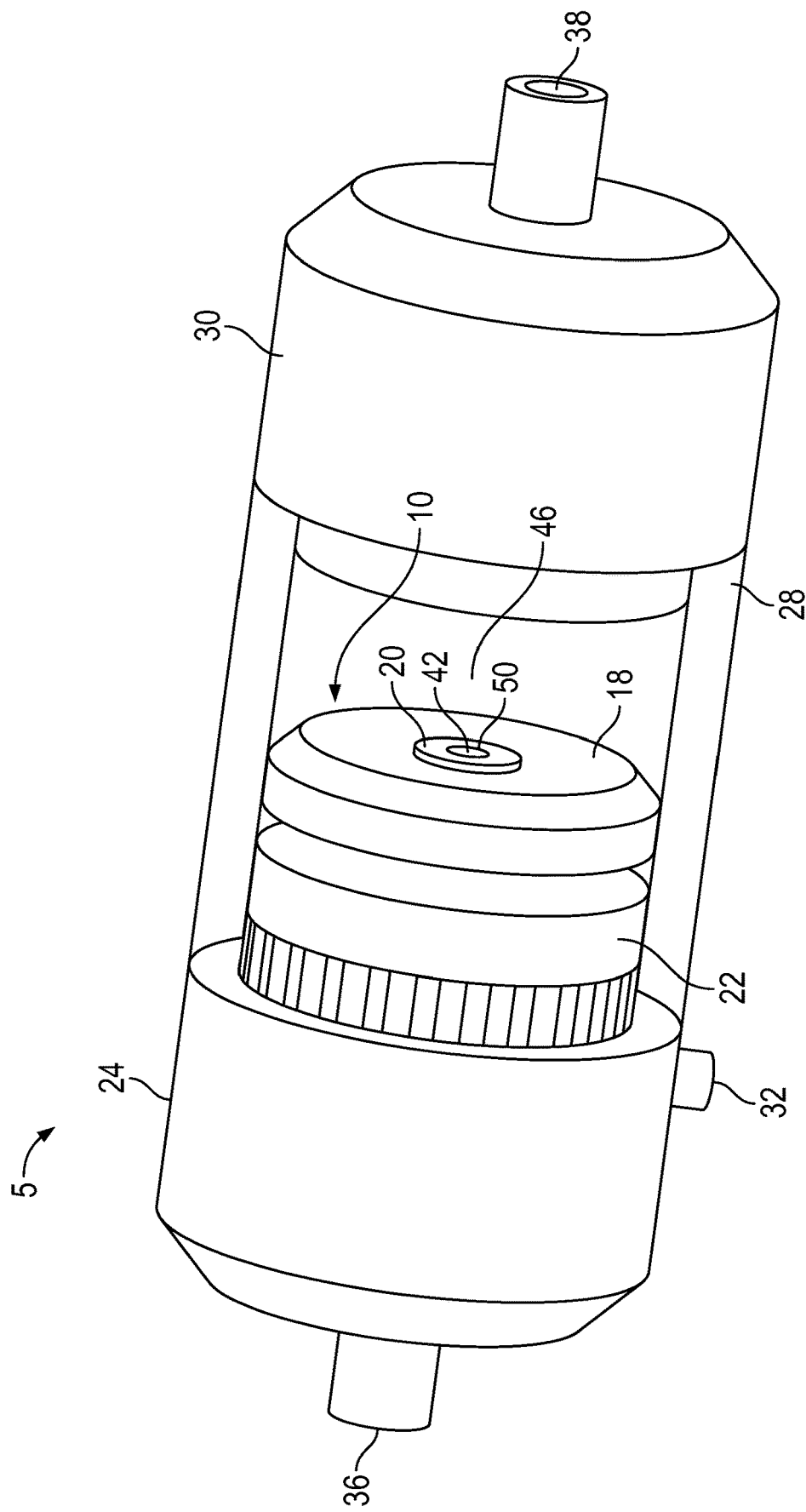
FIG. 1 illustrates a flowmeter according to an embodiment.
Figure 2:
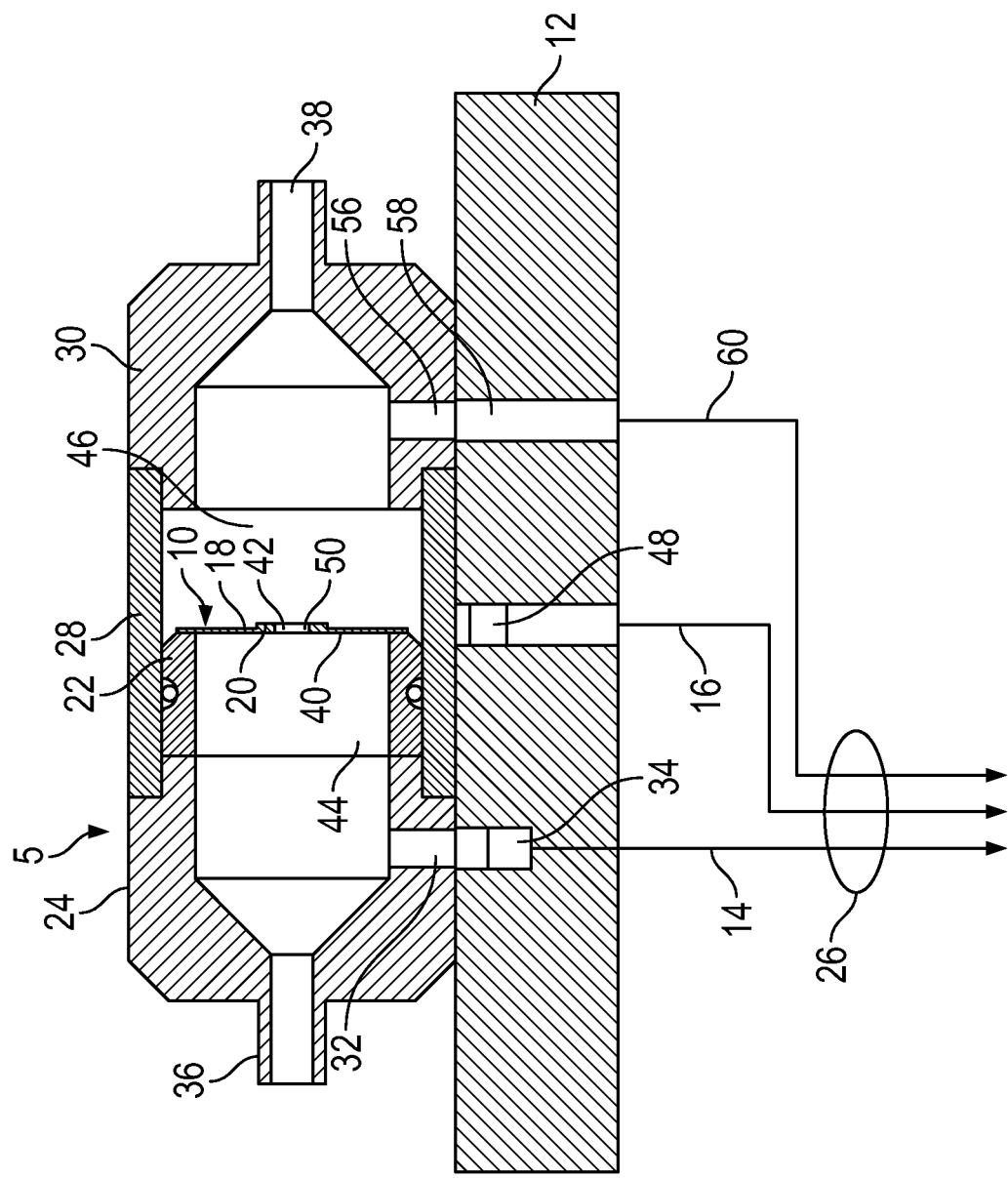
FIG. 2 illustrates a cutaway view of the flowmeter of FIG. 1 also having a base.
Figure 3A:
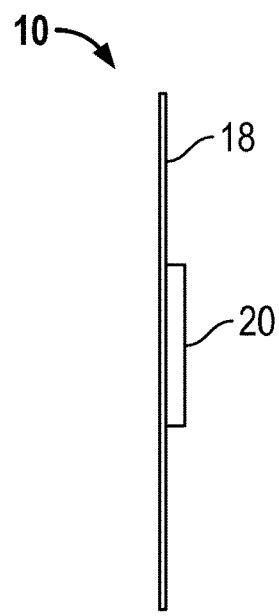
FIGS. 3A-3D illustrate a diaphragm of the flowmeter subjected to increasing fluid force.
Figure 3B:
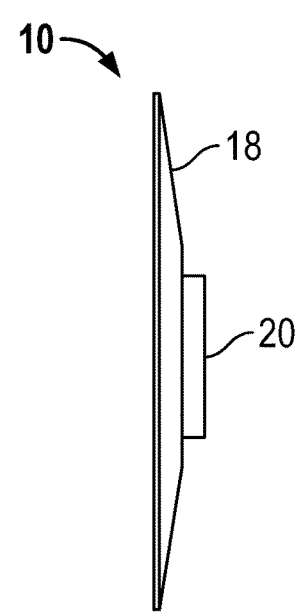
Figure 3C:
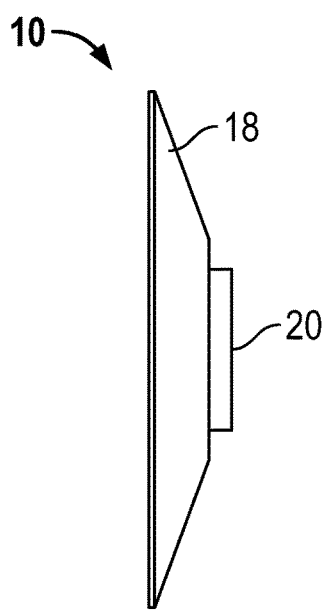
Figure 3D:
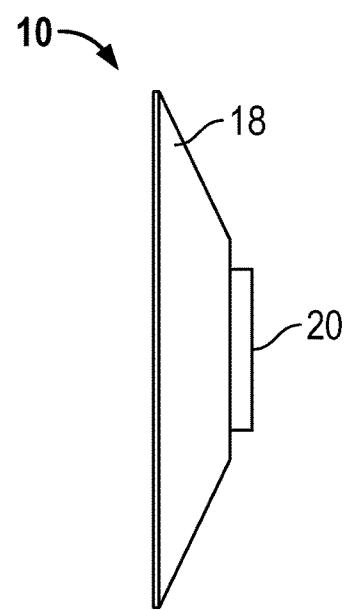
Figure 4:
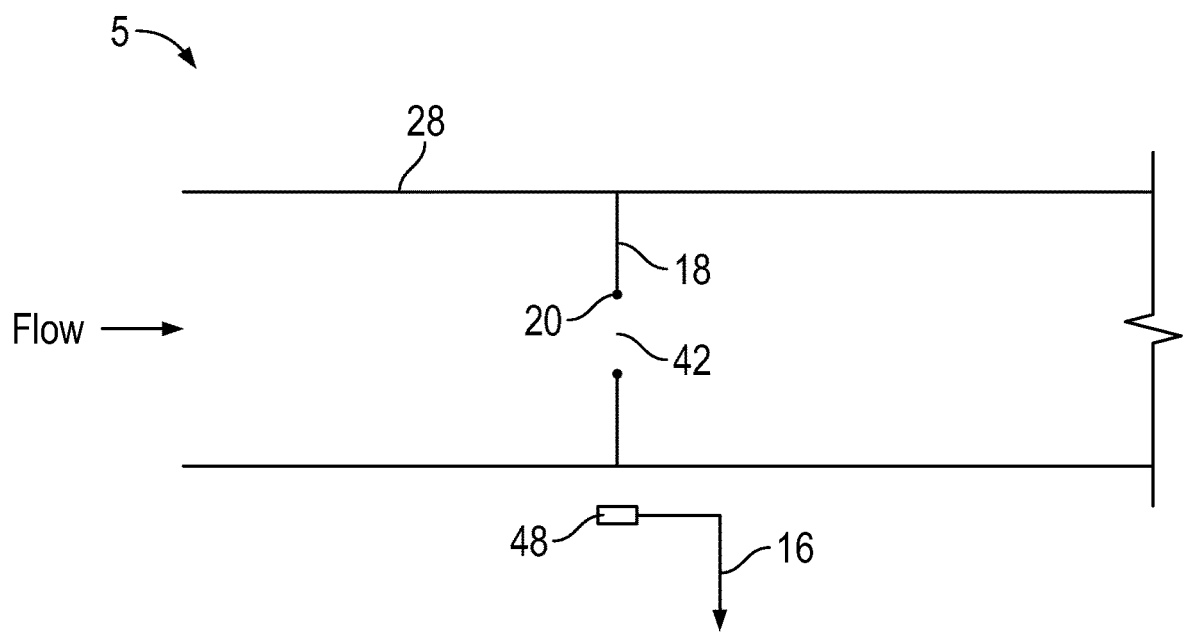
FIG. 4 is a diagram of a flowmeter according to an embodiment.

FIGS. 1 and 2 illustrate a flowmeter 5 according to an embodiment. FIG. 2 illustrates a cross-section of the flowmeter 5 of FIG. 1, also showing a base 12. The flowmeter 5 comprises a sensor assembly 10. The sensor assembly 10 responds to the flow rate of a process material. The process material may be a fluid, a fluid mixture, fluid containing particulates, slurry, etc. Meter electronics (not shown) may be connected to the flowmeter 5 via at least leads 14, 16, 60 to provide flow rate and temperature information over path 26, as well as other information not relevant to the present invention. Sensor assembly 10 may include a diaphragm 18, and at least one sensing ring 20 attached to the diaphragm 18. In an embodiment, the diaphragm 18 is attached to a diaphragm mount 22. In another embodiment, the diaphragm is attached to a first endcap 24 or a second endcap 30.

In an embodiment, a housing 28 is situated between the first endcap 24 and the second endcap 30. The housing 28 may be a transparent material in some embodiments. In another embodiment, the housing 28 is defined by the first endcap 24, or the second endcap 30, or a combination of the first and second endcaps 24, 30. In an embodiment, the housing 28 and endcaps 24, 30 are made of an inexpensive material such as plastic such that the flowmeter 5 is considered disposable, but other materials, such as metals, polymers, ceramics, and any other material known in the art are contemplated. A temperature conduit 32 is illustrated as being disposed in the first endcap 24, but it is also contemplated to be in the second endcap 30 and/or housing 28. The first endcap 24 may have a first port 36 attached thereto, and the second endcap 30 may have a second port 38 attached thereto. In an embodiment, at least one of the ports 36, 38 is defined by an endcap 24, 30. The ports 36, 38 provide a fluid path into and out of the flowmeter 5, respectively. In an embodiment, the second port 38 has an area that is greater than or equal to the first port 36.

The temperature conduit 32 provides fluid contact to a temperature measuring apparatus. In an embodiment, a temperature sensor 34 is disposed in the temperature conduit 32. In an embodiment, a heat-conductive material is disposed in the temperature conduit 32, which may be in thermal communication with the temperature sensor 34. In an embodiment, the temperature sensor 34 comprises a resistance temperature detector. In an embodiment, a heat-conductive member may protrude through an endcap 24, 30 so to be in contact with the process material and also extend externally from the flowmeter 5. In an embodiment, lead 14 is in communication with the temperature sensor 34 and may provide temperature-related information to meter electronics or another device configured to receive temperature data.

A process material is introduced into the first port 36, which then passes through the first endcap 24 and contacts a first side 40 of the diaphragm 18. The pressure of the process material causes the diaphragm 18 to deform, as will be discussed more fully below. An aperture 42 in the diaphragm 18 allows the process material to pass from a first chamber 44 of the flowmeter 5 to a second chamber 46 of the flowmeter 5. As the process material passes through the aperture 42, it may also in some embodiments pass through a second aperture 50 defined by the sensing ring 20. Process material that enters the second chamber 46 may then exit the flowmeter 5 via the second port 38.

The diaphragm 18 is constructed using a flexible material. In an embodiment, the diaphragm is rubber, but other plastics, films, polymers, metals, and suitable diaphragm materials known in the art are contemplated. As a process material flows into the first port 36, the process material exerts a force against the diaphragm 18, which causes the diaphragm 18 to be displaced towards the second chamber 46. Since the sensing ring 20 is attached to the diaphragm 18, the sensing ring 20 is also displaced. Turning to FIGS. 3A-3D, FIG. 3A illustrates a no flow condition, whereas flow is present in FIG. 3B, which is further increased in FIG. 3C, and yet further increased in FIG. 3D. It will be apparent that as flow increases, the force acting upon the diaphragm 18 increases, which results in increased deflection. In an embodiment, the force, F, acting upon the diaphragm 18 may be described as:

$$F = C_D \left(\frac{1}{2}\rho V^2 A\right) \quad (1)$$

where:
ρ is the mass density of the fluid;
V is the flow velocity;
A is the area of the diaphragm; and
$C_D$ is the drag coefficient.

Figure 5:
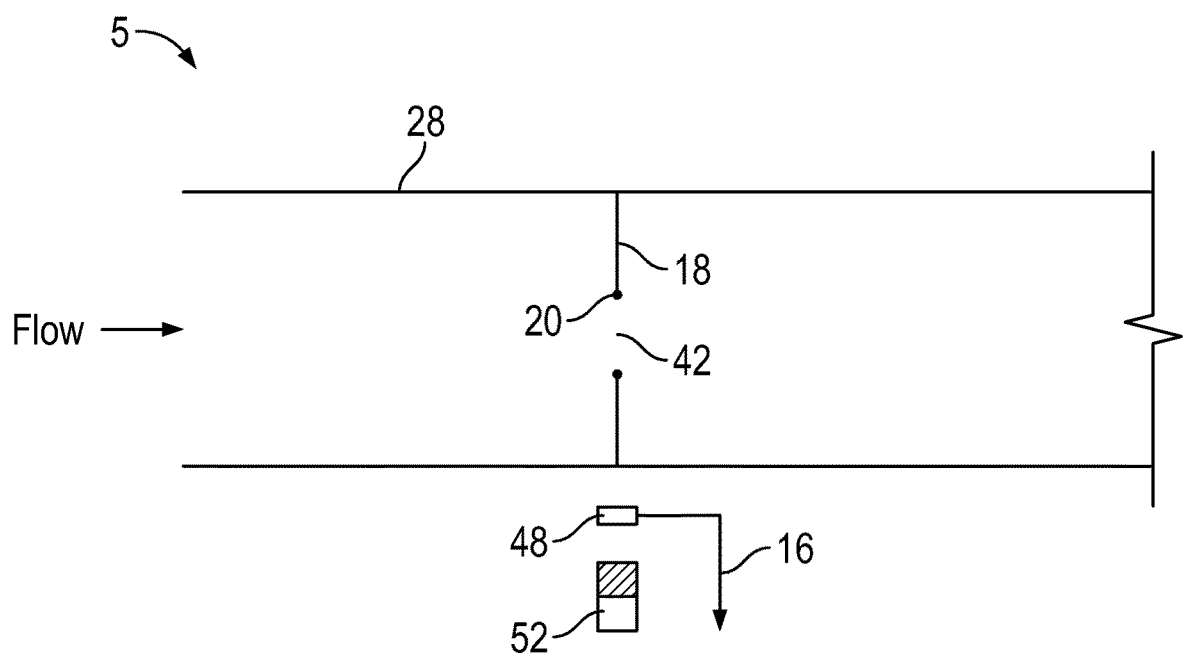
FIG. 5 is a diagram of a flowmeter according to another embodiment.

A sensor 48 is provided to detect the deflection of the sensing ring 20. The sensor 48 detects the changes in a magnetic field that occurs due to the change in distance of the sensing ring 20 from the sensor 48. In an embodiment diagrammatically illustrated by FIG. 4, the sensing ring 20 is magnetic and the sensor 48 detects changes in the magnetic field strength of the sensing ring 20 as it is displaced by fluid flow through the flowmeter 5. In FIG. 5, the sensing ring 20 is made of a ferrous material such as steel, for example without limitation. In addition to the sensor 48, a magnet 52 is provided, and disposed proximate the sensor 48, opposite the sensing ring 20. In yet another embodiment, the sensing ring 20 is an assembly that comprises a magnetic portion and a non-magnetic portion. In these embodiments, the non-magnetic portion may be ferrous or non-ferrous. The sensor 48 may be a Hall effect sensor, for example without limitation. In another embodiment, the sensor 48 mechanically detects deformation of the diaphragm 18. Though in FIG. 5 the magnet 52 is proximate the sensor 48 opposite the sensing ring 20, any relative angle or position of the sensor 48 and magnet 52 in relation to the sensing ring 20 is contemplated. In another embodiment, the sensor 48 is an infrared detector, and senses the displacement of the diaphragm 18.

Figure 6:
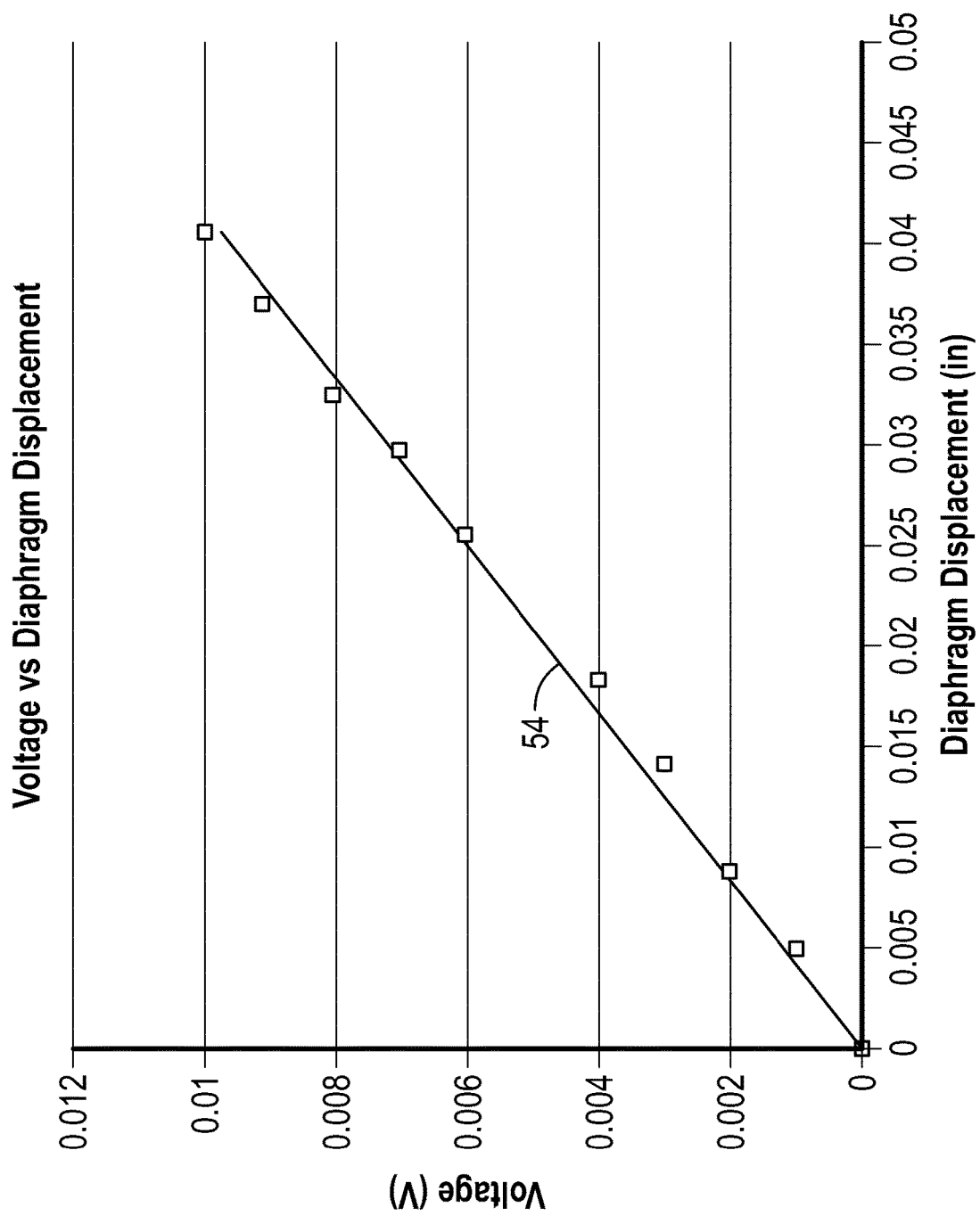
FIG. 6 is a graph illustrating the relationship between sensor voltage and diaphragm displacement.

An output voltage may be created by the sensor 48 in response to a change in the magnetic field, and this change is due to the displacement of the sensing ring 20. In FIG. 2, the sensor 48 is shown in the base 12, but other locations, such as the housing 28, or endcaps 24, 30, for example, without limitation, are contemplated. Since, the displacement of the sensing ring 20 is proportional to flow velocity, and the magnetic field is proportional to the displacement of the sensing ring 20, an output voltage is therefore generated that is proportional to flow velocity. It will be appreciated that the flow vs. displacement slope is predominantly a function of the elasticity of the diaphragm 18 and the size of apertures 42, 50. FIG. 6 illustrates this relationship by providing a diaphragm 18 displacement test. It will be clear that a substantially linear relationship exists between diaphragm displacement and voltage, which is indicated by trend line 54. It will be appreciated that the linear range of response may be adjusted by altering the size and/or elasticity of the diaphragm 18 and/or the size of apertures 42, 50 accordingly.

The volume flow rate, $\dot{Q}$, may, in an embodiment, be derived from the equation:

$$\dot{Q} = \frac{\pi}{4} D^2 V \quad (2)$$

where:
D is the density of the fluid; and
V is the flow velocity.

The output voltage, being proportional to the force exerted upon the diaphragm 18 allows the flow velocity, V, to be derived. Thus by substituting equation (1) into equation (2), flow rate may be derived:

$$\dot{Q} = \frac{\pi}{4} D^2 \left(\frac{F}{C_D \frac{1}{2}\rho \frac{D^2}{4}\pi}\right) \quad (3)$$

This equation may be simplified to:

$$\dot{Q} = \frac{F}{C_D \frac{1}{2}\rho} \quad (4)$$

Thus, volumetric flow rate may be derived from the force that is a result of process material flow.

Turning back to FIG. 2, in an embodiment, the base 12 contains the temperature sensor 34 and the sensor 48, such that the flowmeter 5 portion is simpler and less expensive to produce and also considered disposable. In these embodiments, the temperature sensor 34 is in thermal communication with the process material via temperature conduit 32, which as noted above, may comprise a fluid conduit and/or a heat-conductive material. Similarly, the flowmeter 5 may be placed in proximity to the sensor 48 when installed on the base 12.

In some embodiments, the flowmeter 5 has a data transmitter 56 that contains information about the flowmeter 5. The base 12 may collect/read information of the data transmitter 56 by a data receiver 58. The information of the data transmitter 56 may be at least one of model number, serial number, meter specifications, meter compatibility, calibration information, or any other relevant information known in the art. This information is relayed from the flowmeter 5, via the base 12, to meter electronics or any system to which the flowmeter 5 and base 12 are attached. The data transmitter 56 may be a label, barcode, an RFID tag, SIM card, integrated circuit, magnetic strip, or any means of communicating stored data. Similarly, the data receiver 58 may be a scanner, barcode reader, RFID reader, SIM reader, port for accepting electronic connections, magnetic strip reader, or any other interface to receive stored data. For example, without limitation, the flowmeter 5 may be placed into the base 12, wherein information in an RFID attached to the flowmeter 5 is read by an RFID reader in the base. Calibration and other information is communicated to a device in electronic communication with the base 12, so accurate flow readings may be calculated, as the appropriate calibration and model data is used in flow rate calculations. Similarly, product specifications for the flowmeter 5 may be communicated to a device in electronic communication with the base 12. Should, for example without limitation, a flowmeter 5 having a flow range incompatible with a particular desired use be installed in the base 12, a notification or alarm may be triggered to alert a user that a flowmeter 5 having different specifications should be utilized.

It should be noted that the base 12 may also contain memory, computer-readable media, integrated circuits, amplifiers, filters, signal processors, interfaces, and any related electronics for providing, processing, storing, relaying, displaying, and accepting information to/from the flowmeter 5 and/or to/from a device to which the base 12 is connected.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and methods, and not just to the embodiments described above and shown in the accompanying figures. Accordingly, the scope of the invention should be determined from the following claims.

What is claimed is:

1. A flowmeter (5), comprising:
    a housing (28) configured to accept a flow of a process material;
    a diaphragm (18) disposed in the housing (28), wherein the diaphragm (18) is deformable by the flow of the process material, and wherein the diaphragm (18) comprises an aperture (42) configured to allow process material to flow therethrough;
    a first port (36) through which the process material is introduced to the flowmeter (5);
    a second port (38) through which the process material exits the flowmeter (5); and
    a sensor (48) configured to detect a deformation in the diaphragm (18),
    wherein the flowmeter (5) is configured to measure the flow of the process material,
    wherein at least a portion of a flow path through the flowmeter (5) is a straight and unobstructed flow path through all of the first port (36), the second port (38), and the aperture (42).

2. The flowmeter (5) of claim 1, wherein the diaphragm (18) comprises a sensing ring (20).

3. The flowmeter (5) of claim 2, wherein the sensor (48) is configured to detect a position of the sensing ring (20).

4. The flowmeter (5) of claim 1, wherein the sensor (48) is a magnetic sensor.

5. The flowmeter (5) of claim 1, wherein the sensor (48) is a Hall effect sensor.

6. The flowmeter (5) claim 1, wherein the sensor (48) is an infrared sensor.

7. The flowmeter (5) of claim 2, wherein the sensing ring (20) comprises a ferrous portion.

8. The flowmeter (5) of claim 2, wherein the sensing ring (20) comprises a magnetic portion.

9. The flowmeter (5) of claim 1, further comprising a magnet (52) disposed proximate the sensor (48).

10. The flowmeter (5) of claim 1, further comprising a base (12) configured to receive the flowmeter (5).

11. The flowmeter (5) of claim 10, wherein the sensor (48) is disposed in the base (12).

12. The flowmeter (5) of claim 1, further comprising a temperature sensor (34) configured to detect a temperature of the process material.

13. The flowmeter (5) of claim 12, wherein the temperature sensor (34) is disposed in the base (12).

14. The flowmeter (5) of claim 10, further comprising:
    a data transmitter (56) with the flowmeter (5) comprising associated data; and
    a data receiver (58) with the base (12), wherein the data associated with the data transmitter (56) is communicable to the data receiver (58).

15. The flowmeter (5) of claim 1, wherein the deformation in the diaphragm (18) is proportional to the flow of the process material.

16. A method of measuring a flow of a process material through a flowmeter, comprising:
    providing a housing configured to accept a flow of a process material, having a diaphragm disposed therein, the diaphragm having an aperture;
    providing a first port through which the process material is introduced to the flowmeter;
    providing a second port through which the process material exits the flowmeter;
    providing a sensor configured to detect a deformation in the diaphragm;
    flowing a process material through the housing;
    deforming the diaphragm with the force of flow of the process material; and
    measuring the flow of the process material,
    wherein at least a portion of a flow path through the flowmeter is a straight and unobstructed flow path through all of the first port, the second port, and the aperture.

17. The method of claim 16, wherein the deformation of the diaphragm is proportional to the flow of the process material.

18. The method of claim 16, comprising the step of providing a sensing ring on the diaphragm.

19. The method of claim 16, wherein the sensor is configured to detect a position of the sensing ring.

20. The method of claim 16, wherein the sensor is a magnetic sensor.

21. The method of claim 16, wherein the sensor is a Hall effect sensor.

22. The method of claim 16, wherein the sensor is an infrared sensor.

23. The method of claim 16, wherein the sensing ring comprises a ferrous portion.

24. The method of claim 16, wherein the sensing ring comprises a magnetic portion.

25. The method of claim 16, comprising the step of placing a magnet proximate the sensor.

26. The method of claim 16, comprising the step of providing a base configured to receive the flowmeter.

27. The method of claim 26, wherein the sensor is disposed in the base.

28. The method of claim 16, comprising the step of providing a temperature sensor configured to detect a temperature of the process material.

29. The method of claim 28, wherein the temperature sensor is disposed in the base.

30. The method of claim 26, further comprising the steps of:
provide a data transmitter with the flowmeter;
transmitting data with the data transmitter;
providing a data receiver with the base; and
receiving the data with the data receiver.

* * * * *